(12) United States Patent
Huang et al.

(10) Patent No.: US 10,712,917 B2
(45) Date of Patent: Jul. 14, 2020

(54) METHOD FOR SELECTING AN ELEMENT OF A GRAPHICAL USER INTERFACE

(71) Applicant: ORANGE, Paris (FR)

(72) Inventors: Menghuai Huang, Beijing (CN); Zhihong Guo, Beijing (CN); Nan Ye, Beijing (CN); Yanke Wang, Beijing (CN)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/773,788

(22) PCT Filed: Oct. 27, 2016

(86) PCT No.: PCT/IB2016/001723
§ 371 (c)(1),
(2) Date: May 4, 2018

(87) PCT Pub. No.: WO2017/077390
PCT Pub. Date: May 11, 2017

(65) Prior Publication Data
US 2018/0329611 A1    Nov. 15, 2018

(30) Foreign Application Priority Data

Nov. 4, 2015 (WO) ................ PCT/CN2015/093774

(51) Int. Cl.
*G06F 3/041*     (2006.01)
*G06F 3/0484*    (2013.01)
*G06F 3/0488*    (2013.01)

(52) U.S. Cl.
CPC .......... *G06F 3/04842* (2013.01); *G06F 3/041* (2013.01); *G06F 3/04883* (2013.01)

(58) Field of Classification Search
CPC .............................. G06F 3/04842; G06F 3/041
See application file for complete search history.

(56) References Cited

U.S. PATENT DOCUMENTS

| 8,447,236 B2 | 5/2013 | Gorokhov et al. |
| 8,750,152 B2 | 6/2014 | Koo et al. |

(Continued)

FOREIGN PATENT DOCUMENTS

| CN | 102032906 A | 4/2011 |
| CN | 102955590 A | 3/2013 |
| CN | 103076982 A | 5/2013 |
| CN | 103823630 A | 5/2014 |
| CN | 104516620 A | 4/2015 |

OTHER PUBLICATIONS

International Search Report dated Feb. 16, 2017 for corresponding International Application No. PCT/IB2016/001711, filed Oct. 27, 2016.

(Continued)

*Primary Examiner* — Xuemei Zheng
(74) *Attorney, Agent, or Firm* — David D. Brush; Westman, Champlin & Koehler, P.A.

(57) ABSTRACT

A method for selecting at least one element of a Graphical User Interface (GUI), displayed on a display of a device using a touch interface of the device. The method includes: detecting on the touch interface a double touch input, including a first touch input and a second touch input respectively corresponding to a first location and a second location on the GUI; determining a selection location between the first and second locations; upon detecting a release of the first touch input, determining a first selection location corresponding to the selection location at the moment of the release of the first touch input; determining an initial preselection including at least one GUI element located between the first selection location and the second location; determining a preselection of at least one GUI element based on the initial preselection; and executing a selection of the preselection.

18 Claims, 4 Drawing Sheets

(56) References Cited

U.S. PATENT DOCUMENTS

| | | |
|---|---|---|
| 10,383,020 B2 | 8/2019 | Stanze et al. |
| 2009/0288043 A1 | 11/2009 | Willis |
| 2011/0077851 A1 | 3/2011 | Ogawa et al. |
| 2012/0056836 A1* | 3/2012 | Cha .................... G06F 3/04842 345/173 |
| 2012/0287065 A1 | 11/2012 | Oshinome |
| 2013/0285928 A1* | 10/2013 | Thorsander ........... G06F 3/0488 345/173 |
| 2014/0157181 A1 | 6/2014 | Fukuda et al. |
| 2014/0359528 A1 | 12/2014 | Murata |
| 2015/0058723 A1 | 2/2015 | Cieplinski et al. |
| 2015/0082246 A1 | 3/2015 | Tan et al. |
| 2017/0031502 A1 | 2/2017 | Rosenberg et al. |
| 2018/0329611 A1 | 11/2018 | Huang et al. |

OTHER PUBLICATIONS

Written Opinion of the International Searching Authority dated Feb. 16, 2017 for corresponding International Application No. PCT/IB2016/001711, filed Oct. 27, 2016.

International Search Report dated Jun. 6, 2016 for corresponding International Application No. PCT/CN2015/093775, filed Nov. 4, 2015.

Written Opinion of the International Searching Authority dated Jun. 6, 2016 for corresponding International Application No. PCT/CN2015/093775, filed Nov. 4, 2015.

International Search Report dated Feb. 13, 2017 for corresponding International Application No. PCT/IB2016/001723, filed Oct. 27, 2016.

Written Opinion of the International Searching Authority dated Feb. 13, 2017 for corresponding International Application No. PCT/IB2016/001723, filed Oct. 27, 2016.

International Search Report dated Jul. 4, 2016 for corresponding International Application No. PCT/CN2015/093774, filed Nov. 4, 2015.

Written Opinion of the International Searching Authority dated Jul. 4, 2016 for corresponding International Application No. PCT/CN2015/093774, filed Nov. 4, 2015.

Office Action dated Oct. 18, 2019 from the USPTO for corresponding U.S. Appl. No. 15/773,784, filed May 4, 2018.

Final Office Action dated Mar. 18, 2020 from the USPTO for corresponding U.S. Appl. No. 15/773,784, filed May 4, 2018.

* cited by examiner

METHOD FOR SELECTING AN ELEMENT OF A GRAPHICAL USER INTERFACE

CROSS-REFERENCE TO RELATED APPLICATIONS

This Application is a Section 371 National Stage Application of International Application No. PCT/IB2016/001723, filed Oct. 27, 2016, the content of which is incorporated herein by reference in its entirety, and published as WO 2017/077390 on May 11, 2017, not in English.

FIELD OF THE DISCLOSURE

The invention pertains to the field of Graphical User Interfaces of electronic devices, and to the ways of carrying out a selection of elements of such interfaces with a view to perform certain functions based on the content of the selection carried out.

BACKGROUND OF THE DISCLOSURE

On a large number of electronic devices, for instance in which the display and the touch interface are combined in the form of a touch screen through which the user interacts with a Graphical User Interface, or GUI, displayed on the touchscreen, selecting GUI elements is carried out through a form of pointing on the desired element using the touch interface.

For instance, one may select a textual GUI element such as a word on a display by pressing a finger directly onto the word via the touch screen.

This principle presents a major drawback: the presence of the finger directly over the desired element obstructs the vision of the user, which results in a poor placement precision and the user having to carry out the selection again. This tends to mobilize unnecessarily the resources involved in the selection process, such as an interface controller, an event listener for the touch interface, a central processing unit of the device, etc., as well as the battery used to power all these elements.

SUMMARY

The invention therefore aims at improving this situation.

To that end, the invention relates to a method for selecting at least one element of a Graphical User Interface, or GUI, displayed on a display of a device using a touch interface of said device, the method comprising:
  detecting on the touch interface a double touch input, said double touch input comprising a first touch input and a second touch input on the touch interface, said first and second touch inputs respectively corresponding to a first location and a second location on the GUI,
  determining a selection location located between the first and second locations,
wherein the method further comprises:
  upon detecting a release of the first touch input, determining a first selection location corresponding to the selection location at the moment of the release of the first touch input,
  determining an initial preselection comprising at least one GUI element located between the first selection location and the second location at the moment of the release of the first touch input,
  determining a preselection of at least one GUI element based on the initial preselection, and
  executing a selection of said preselection.

According to an aspect of the invention, the method further comprises detecting on the touch interface a displacement of at least one touch input among the first and second touch inputs, and adjusting the position of the corresponding first or second location and of the selection location as a function of said displacement.

According to an aspect of the invention, determining the preselection comprises determining that the preselection corresponds to the initial preselection.

According to an aspect of the invention, determining the preselection comprises determining a second selection location as defined by a user using the touch interface, said preselection comprising at least one GUI element located between the first selection location and the second selection location.

According to an aspect of the invention, determining the second selection location is carried out as a function of the selection location, and defining the second selection location further comprises:
  after said release of the first touch input has been detected, initializing the position of the selection location at a given position,
  determining a new selection location as defined by the user using the touch interface, and
  determining the second selection location as a function of the new selection location.

According to an aspect of the invention, the selection location is initialized at a position corresponding to the position of the second location at the time of said release of the first touch input.

According to an aspect of the invention, after initialization of the position of the selection location, the selection location is associated with the second touch input, whereby a movement of the second touch input on the interface causes the selection location to move in the GUI, thereby defining the new selection location.

According to an aspect of the invention, the method further comprises displaying on the GUI a touch input marker at a position distant from the position of the selection location upon initialization of the position of the selection location, detecting that a third touch input has been performed at a location of the touch interface corresponding to the touch input marker, and associating the selection location with the third touch input, whereby a movement of the third touch input causes a movement of the selection location in the GUI.

According to an aspect of the invention, detecting the release of the first touch input triggers a dragging mode in which the selection location is configured to be modified by a user by moving on the touch interface the touch input associated with the selection location, and detecting a new touch input on the interface during the dragging mode triggers a fine tuning mode in which the selection location is located between a new location of the GUI associated with the new touch input and a location in the GUI associated with the touch input the selection location was associated with in the dragging mode prior to the triggering of the fine tuning mode, whereby in said fine tuning mode, the selection location is configured to be moved by a user by moving the new touch input and/or the touch input the selection location was associated with in the dragging mode prior to the triggering of the fine tuning mode.

According to an aspect of the invention, determining the second selection location as a function of the new selection location comprises detecting a release of the touch input or the touch inputs associated with the selection location, and determining the second selection location as the position of the selection location at the time of said release.

According to an aspect of the invention, the method further comprises displaying on the GUI a location marker at the selection location to make said selection location visible.

According to an aspect of the invention, detecting the double touch input comprises determining that the double touch input is of a predefined type, wherein said predefined type is defined by at least one of the criteria according to which the predefined type corresponds to a pressure applied to the touch interface simultaneously for the first and second touch input, and the first and second touch input have a duration greater than a predetermined threshold.

According to an aspect of the invention, the GUI elements comprise text elements, and the preselection includes a sequence of the text elements located between the first selection location and the second location.

According to an aspect of the invention, the GUI elements of the preselection are highlighted.

The invention further relates to a computer program comprising instructions for the execution of the method as defined above when executed by a processor.

The invention also relates to a control module for an electronic device comprising a touch interface and being configured to display a Graphical User Interface, or GUI, said control module being configured to:
  upon detection on said touch interface of a double touch input comprising a first touch input and a second touch input on the touch interface, said first and second touch inputs respectively corresponding to a first and a second location on the GUI, determine a selection location located between the first and second locations,
  upon detection of a release of the first touch input, determine a first selection location corresponding to the selection location at the moment of the release of the first touch input,
  determining an initial preselection comprising at least one GUI element located between the first selection location and the second location at the moment of the release of the first touch input,
  determining a preselection of at least one GUI element based on the initial preselection, and
  executing a selection of said preselection.

According to an aspect of the invention, the control module comprises an interface controller configured to detect inputs on the touch interface of said device.

The invention further relates to an electronic device comprising a display adapted for displaying a Graphical User Interface, or GUI, and a touch interface adapted for interacting with the GUI, said electronic device further comprising a control module as defined above.

BRIEF DESCRIPTION OF THE DRAWINGS

The invention will be better understood in light of the following description, given in a non-limiting manner and made in reference to the appended Figures, in which.

DETAILED DESCRIPTION OF ILLUSTRATIVE EMBODIMENTS

Figure 1:
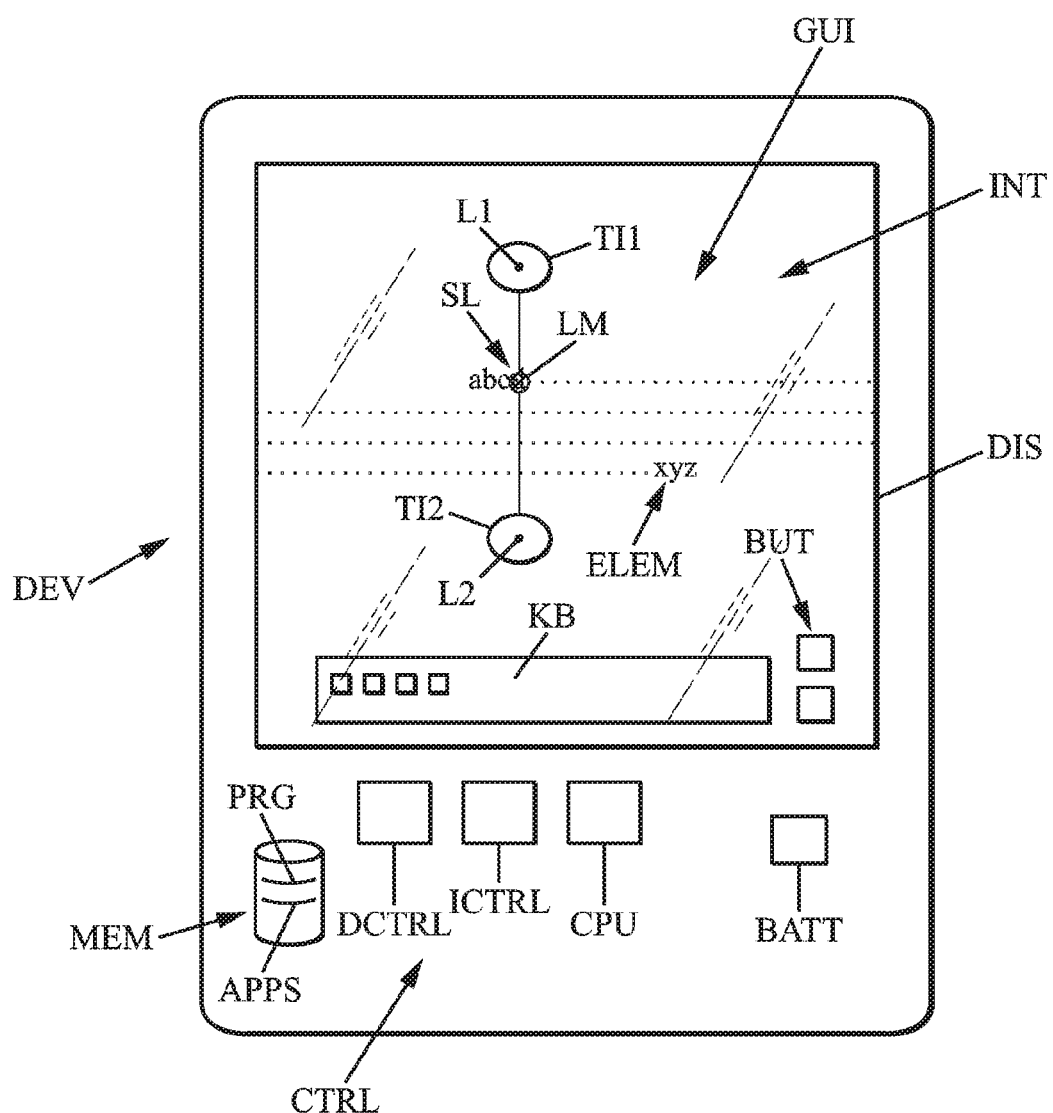
FIG. 1 is an illustration of an electronic device according to the invention.

FIG. 1 illustrates an electronic device, or device, DEV according to the invention.

The device DEV is for instance a handheld device, such as a smartphone, a laptop, a touchpad, or the like.

The device DEV is configured to run applications and to render the applications for a user so that the latter may interact with the applications to perform a given number of operations relying on functionalities of these applications.

To that end, the device DEV comprises a display DIS, a human-machine interface, or interface, INT, a display controller DCTRL, an interface controller ICTRL, a processor CPU, a memory MEM, and a battery BATT. These elements are operatively coupled together.

The battery BATT is adapted to provide electrical energy to the various components of the device DEV for their operations.

The processor CPU is configured to run applications APPS contained in the memory MEM for the operations of the device DEV. The applications APPS, or programs, include among others an Operating System for the common operations of the device DEV.

The memory MEM is configured to store the applications APPS. In addition, the memory is configured to store a computer program PRG which the processor CPU is also configured to run. The program PRG comprises instructions whose execution by the processor CPU translates into the implementation of the method according to the invention which is described in detail below.

The memory MEM may take any know form, such as a plurality of different memory components or a single component, and may comprise a volatile memory component and/or a non-volatile memory component.

The display DIS is adapted for the rendering of the result of the processing of the applications APPS by the processor CPU. For instance, the display DIS comprises a screen SCR.

The display controller DCTRL is configured to trigger the rendering of the result of the processing of the applications APPS on the basis of command signals received from the processor CPU.

The display controller DCTRL may comprise a chipset, such as a dedicated chipset or a chipset integrated to another component of the device DEV.

The interface INT is configured to allow inputs from the user of the device so that the user may interact with the device and trigger the performance of given functions of the applications.

In the context of the invention, the interface INT is a touch interface, i.e. an interface which reacts to pressure inputs applied to it by the user. The underlying sensing technology may be of any known form.

Through the interface INT, the user may interact with the device using gestures involving his fingers. For instance, these gestures, or touch inputs hereinafter, include the application of one or more pressure points on the interface INT using the fingers, such as immobile pressure inputs, tapping movements, sliding movements, pressure inputs of various durations and using any given number of fingers whether immobile or not relative to the interface INT, pinching movements with several fingers, and the like. Alternatively or in parallel, he may interact with the device through the interface using a tool designed to that end, such as a stylus.

Advantageously, and in the following description, the interface INT is combined with the display DIS in the form of a touchscreen. For example, the screen SCR is thus a touchscreen. The user may then interact with the applications APPS by carrying out touch inputs directly onto the screen SCR.

The interactions of the user with the device DEV using the interface INT is advantageously carried out through a Graphical User Interface displayed on the display DIS, as illustrated in FIG. 1.

The GUI comprises GUI elements ELEM. The elements ELEM form all or part of the content displayed on the display DIS. For instance, these elements ELEM are by-products of the processing of the applications APPS by the processor CPU, which then commands their display by the display DIS to the display controller DCTRL.

In the context of the invention, the elements ELEM particularly comprise textual elements, which are a by-product of the running of applications APPS by the processor CPU, such as a messaging application, a web or document browsing application or the like. The textual elements comprise alphanumerical characters, icons, images (for instance of small size) or any element commonly used in messages exchanged in text messaging applications or in document browsing applications.

These elements are laid out sequentially on the display DIS. This sequence may obey an order which varies from one language to the other.

Typically, for a language such as English, this sequence is organised horizontal lines spaced apart vertically which are read from left to right and from top to bottom from one line to the other.

In a general manner, the textual elements are organized according to a sequence comprising at least two directions which are run through in a given way for each direction.

The elements ELEM may moreover include virtual actuation elements such as a virtual keyboard, virtual buttons, etc.

The interface controller ICTRL is configured to manage the interface INT. In particular, it is configured to detect the inputs of the user on the interface INT, in particular the location of these inputs over the interface, and to either forward the corresponding information to the processor CPU on the basis of which the latter determines if the inputs are to trigger a specific action, or carry out this determination itself.

For instance, the interface controller ICTRL is thus configured to determine that the user has performed a touch input on the interface having a duration superior to a predetermined threshold, that the user has carried a sliding movement of a finger on the interface INT, that several fingers were pressed simultaneously on the interface INT, and so on.

In the context of the invention, the processor CPU, the interface controller ICTRL and the display controller DCTRL form a control module CTRL configured to carry out the steps of the method according to the invention.

In the example of Figure, these elements have been depicted as being separate. However, alternative embodiments in which they are combined, for instance in the form of the processor configured to carry out the functions of the interface controller and/or of the display controller, are also envisaged.

The method may be implemented through the execution by the module CTRL, in particular by the processor CPU, of the instructions comprised in the computer program PRG located in the memory MEM (FIG. 1).

The method according to the invention of selecting at least one GUI element using the interface INT is intended to provide an improved principle of carrying out a selection of GUI elements, such a selection aiming at being processed through a given functionality of an application. For instance, this selection is carried out so that the user may perform a "copy" function through which the selected GUI elements are memorized to be exported to another application (for instance through a "paste" function), and so on.

Figure 2:
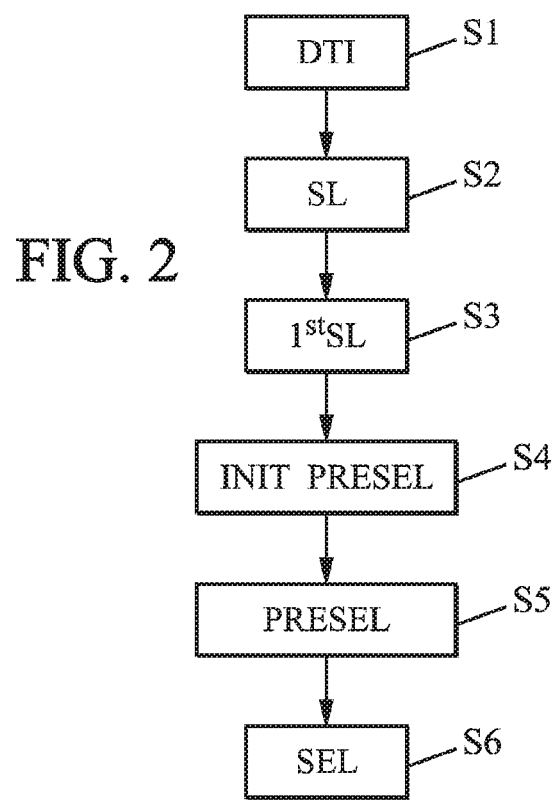
FIG. 2 is a bloc diagram illustrating a method of selecting a GUI element according to the invention.

In reference to FIG. 2, in the context of the method according to the invention, the device DEV is initially operating, and GUI elements are displayed on the display DIS.

In a first step S1 of the method, the interface controller ICTRL detects a double touch input DTI (FIG. 1) on the interface INT.

This double touch input DTI comprise a first touch input TI1 and a second touch TI2 on the touch interface INT. Each touch input corresponds to a pressure being applied by a user to the touch interface.

These touch inputs TI1, TI2 respectively define a first location L1 (marked by a dot in FIG. 1) and a second location L2 within the GUI. These locations L1, L2 are for instance spaced apart.

The first location L1 is associated with the first touch input TI1, in that when movements of the first touch input TI1 are detected on the interface INT, the position of the first location L1 is adjusted as a function of the movement of the first touch input INT1. The same goes for the second location L2 and the second touch input TI2.

For instance, the touch inputs TI1, TI2 and the first and second locations L1, L2 correspond spatially. In other words, the first location L1 is located directly beneath the first touch input TI1, and the same is true for the second touch input and the second location.

However, the touch inputs TI1, TI2 may be transformed into the first and second location by the interface controller ICTRL through the application of a transformation function. For instance, this transformation function includes or corresponds to an offsetting operation through which the first and second locations are shifted from the touch input TI1, TI2 in one or more direction and are thus not located directly beneath the touch inputs.

Advantageously, upon detection of the double touch input DTI, the interface controller ICTRL determines if this double touch input DTI is of a predetermined type.

Advantageously, this predetermined type is defined by at least one of the following criteria:
 The first and second touch inputs FT1, FT2 each correspond to a pressure applied to the interface,
 The first and second touch inputs FT1, FT2 occurred substantially simultaneously, and
 They each have a duration greater then a predetermined threshold.

By "substantially simultaneously", it is understood that the time interval between the detection of the first and second touch inputs (i.e. the moment the pressure is detected for each of them) is smaller than a predetermined duration, such as 300 milliseconds.

Only some of these conditions may be used. Alternatively, all the conditions are used. Moreover, other conditions may also be employed as well, such as conditions related to the first and second touch inputs being immobile relative to the interface for all or part of their duration. Another condition which may be employed relates to the first and/or second touch input being in a specific area of the interface, for instance a top or first side portion of the interface for the first touch input, and a bottom or second side portion of the interface for the second touch input.

The use of the predetermined type may prevent interferences between the method according to the invention and functionalities which are implemented in devices and which rely on double touch inputs, the latter not needing to verify any specific condition.

If the double touch input DTI is detected, and optionally determined as being of the predetermined type, the interface controller ICTRL reports that fact to the processor CPU, and the device DEV moves on to carry out the next step. If not, the method is stopped.

During a step S2, the control module CTRL determines the position within the GUI of a selection location SL as a function of the first and second locations L1, L2. At least during this step S2, the selection location is located between the first and second locations L1, L2. This selection location is defined as an intermediate position between the first and second locations L1, L2. In effect, the first and second locations L1, L2 define between them a segment of a straight line. Advantageously, the selection location SL corresponds to the middle of that segment.

Moreover, advantageously, the processor CPU orders to the display controller DCTRL the display of a location marker LM (symbolized by a cross in a circle on FIG. 1) at the selection location SL, so that the latter may be made visible to the user.

During step S2, upon detection of a movement of the first and/or second touch input TI1, TI2 along the interface INT, the position of the selection location SL is adjusted as a function of the movement of the first and second locations L1, L2 due to the movement of the first and second touch inputs TI1, TI2.

For instance, in the example of the Figures, it is adjusted to remain at the middle of the segment defined by the two locations L1, L2.

To that end, the interface controller ICTRL detects the movement of the first and/or second touch input TI1, TI2, determines the corresponding displacement of the first and/or second location within the GUI, determines the position of the selection location in the GUI, reports the information to the processor CPU, which in turn writes the information in the memory MEM. If a location marker LM is used, the processor CPU further commands the display of the location marker LM at the adjusted selection location to the display controller DCTRL. In some embodiments, all or part of the actions carried out by the interface controller ICTRL are carried out by the processor CPU, such as computing the position of the selection location based on the adjusted first and/or second locations.

During a step S3, the control module CTRL determines a first selection location SL1 based on the actions of the user on the interface. In particular, this determination is based on the selection location SL.

Figure 3:
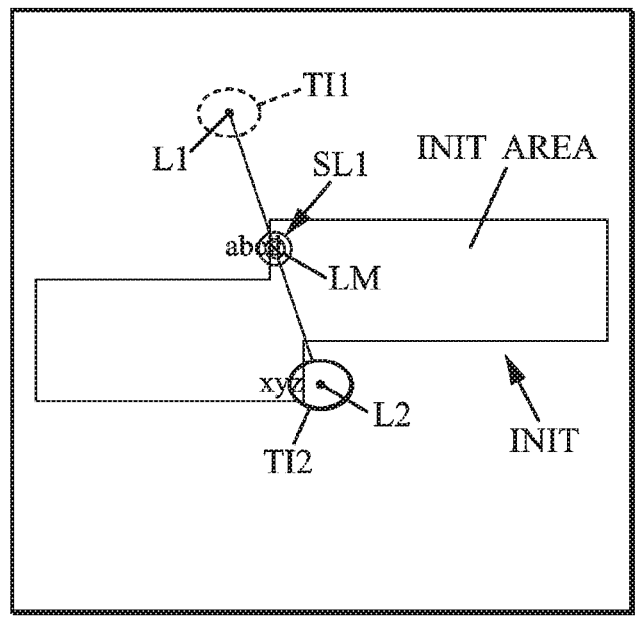
FIGS. 3 to 6 are illustrations of a display of a device according to the invention during steps of the method of FIG. 2.

To that end, in reference to FIG. 3, the interface controller ICTRL detects the release of one of the touch inputs TI1, TI2 from the interface INT, for instance touch input T1 (shown with a dashed line on FIG. 3). The position of the selection location SL within the GUI at the instant this release is detected and memorized and corresponds to the first selection location SL1.

This first selection location SL1 is depicted in FIG. 3 as being on top of a GUI element (the letter "g") and is illustrated by a circle surrounding the location marker (which may be absent in some embodiments).

The release in question corresponds to a removal from the interface INT of the finger used to perform the corresponding touch input by the user.

During a step S4, the control module CTRL carries out an initial preselection INIT of GUI elements based on the first selection location SL1 defined in the previous step and on the first or second location corresponding to the remaining touch input at the time of the release. In the example of the Figures, the remaining touch input corresponds to the second location L2.

This initial preselection INIT comprises all or part of the GUI elements located between the first selection location and the second location. For textual elements, the initial preselection advantageously comprises all of the elements located between these locations (in the sense of the sequence according to which the textual elements are organized).

In the example of FIG. 3, the first selection location SL1 is located over a letter "d" and the second location at the time of the release of the first touch input is located right after a letter "z" (in the sense of the sequence according to which the textual elements are organized).

The initial preselection INIT may be seen as corresponding to an initial preselection area INITAREA having two extremities which are for one defined by the first selection location SL1 and for the other by the remaining location among the first and second location L1, L2 (here, the second location L2).

The initial preselection INIT covers all the elements which are included in the line of the letter "d" and are located "after" it (in the sense of the sequence of the characters), all the elements which are included in the lines between that of the first selection location and the line of the second selection location, and all the elements which are located in the line of the second selection location SL2 and which are located "before" the letter "z" (in the sense of the sequence of the characters).

Whether the GUI elements which are in the neighborhood of the first selection location SL1 and the remaining location L1, L2 are considered inside or outside the initial preselection may be decided freely. Moreover, the very definition of this neighborhood may be adjusted.

For instance, when one of the first selection location and the remaining location is directly over a textual element, the textual element is encompassed in the initial preselection. Alternatively, he may be left outside the preselection. If the first selection location and the remaining location L1, L2 which defines the beginning, respectively the end of the initial preselection corresponds to a gap between elements, the next element, respectively the previous element (in the sense of the sequence according to which the textual elements are organized) is for instance encompassed in the initial preselection. Alternatively, he may be left outside.

Moreover, if one or both of these locations correspond to a textual element which forms part of a word, the entire word may be encompassed in the initial preselection and thereby corresponds to the "neighborhood" of the corresponding first or second selection location. Alternatively, this word may entirely be left outside.

Once the initial preselection is defined, the preselection of the GUI elements it contains is carried out.

This operation of preselection comprises modifying the aspect of the GUI elements of the initial preselection INIT. For instance, these elements are thus highlighted.

In some embodiments, it is limited to this operation of modifying the aspect of the GUI elements contained in the initial preselection.

During a step S5, a preselection PRESEL of GUI elements is defined based on the initial preselection INIT.

In effect, during this step S5, the user either modifies the preselected GUI elements using the initial preselection INIT as a starting point, or decides to leave the GUI elements preselected through the initial preselection unchanged, thereby transforming the initial preselection INIT into the preselection PRESEL.

To that end, a second selection location SL2 is determined based on the actions of the user on the interface INT.

To this end, one of two operating modes for defining the second selection location SL2 is implemented, the user being able to switch from one mode to the other in a manner detailed below:

- a dragging mode, in which the selection location is associated with a touch input, for instance the touch input that remains after the first touch input was released, and in which the user moves the selection location in the GUI by dragging the associated touch input along the interface INT, i.e. by performing a sliding movement of the finger in contact with the interface INT, and
- a fine tuning mode, in which the selection location is associated with at least two touch inputs, such as the second touch input and a new touch input, and in which the user moves the selection location in the GUI using the associated touch inputs.

At the beginning of step S5, the dragging mode is initiated. Upon initialization of the dragging mode, the selection location is initialized at a given position.

For instance, this given position corresponds to the location of the touch input that remained at the moment the first selection location was defined (the second location L2 in the Figures). If in use, the location marker LM is located accordingly.

From there on, several embodiments may be used to define the second selection location SL2 using the selection location SL in the dragging mode.

Figure 4:
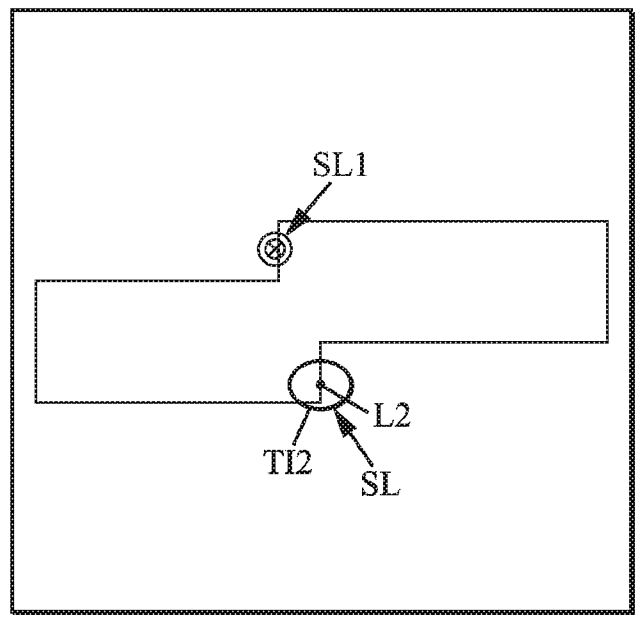

In a first embodiment, the selection location becomes associated with the remaining touch input, whereby a movement of this touch input causes a movement of the selection location. This association is configured so that the selection location SL is directly beneath the touch input. As illustrated in FIG. 4, in embodiments in which the second location is also directly beneath the second touch input (or the corresponding touch input), the second location L2 and the selection location SL correspond to each other.

Figure 5:
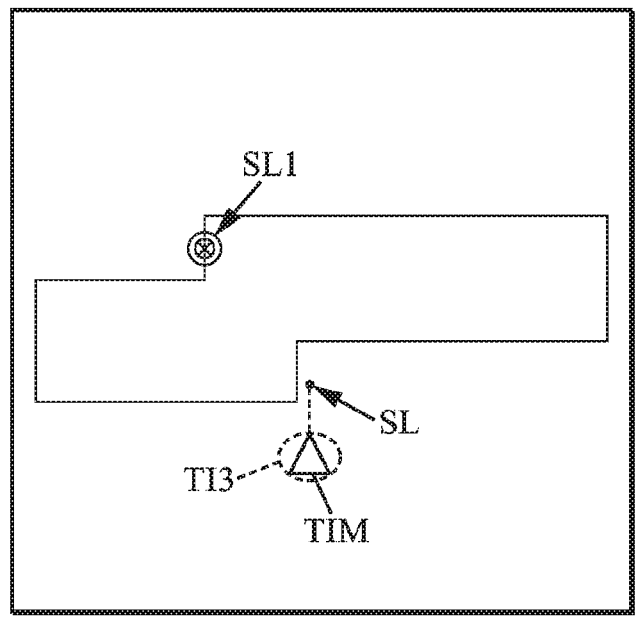

Advantageously, the relative spatial configuration of the selection location and the remaining touch input is maintained when the new touch input is moved on the interface INT In reference to FIG. 5, in a second embodiment, the selection location SL is associated to a new touch input spaced apart from the selection location.

For instance, to that end, upon initialization of the selection location SL at its given position (for instance at the second location at the time of the release of the first touch input), the control module commands the display of a touch input marker TIM (illustrated by a triangle on FIG. 5) at a distance from the selection location.

The interface controller ICTRL then detects that the second touch input is released and that a third touch input TI3 (shown with dashed lines in FIG. 5) is performed by the user on the touch input marker TIM.

When the third touch input TI3 is performed on the touch input marker TIM, the selection location becomes associated with the third touch input TI3, whereby a movement of the third touch input TI3 on the interface causes a corresponding movement of the selection location SL in the GUI.

Advantageously, this corresponding movement is identical. In other words, the relative spatial configuration of the selection location and the third touch input TI3 is maintained when the third touch input TI3 is moved on the interface INT.

This second embodiment enhances the precision with which the user may position the selection location in the dragging mode, as it is not located directly beneath his finger.

Whether in the context of the first or second embodiment, different ways of determining the movement of the selection location due to a movement of the associated touch input may be employed.

As indicated above, the movement of the selection location may be identical to that of the corresponding touch input.

Figure 6:
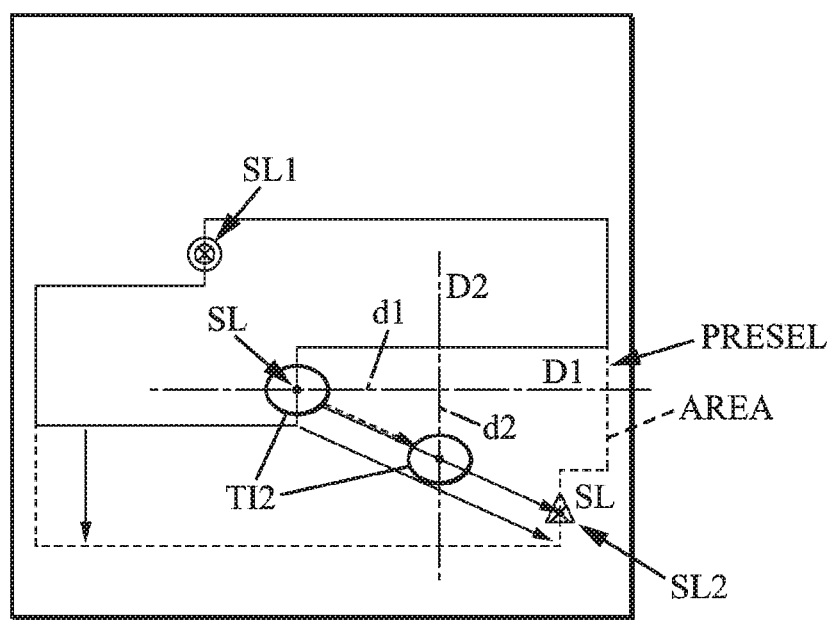

However, alternatively, in reference to FIG. 6 in which the two arrows represents the movements of the touch input associated with the selection location (touch input TI2 in FIG. 6) and of the selection location SL respectively, a displacement of the associated touch input over the interface defines a traveled distance d1, d2 of the second location L2 along two directions D1, D2 of the GUI. These two directions may be chosen freely, but are preferably perpendicular to one another. For instance, they correspond to a vertical direction and a horizontal direction (relative to the display DIS or the interface INT).

The traveled distance d1 and/or d2 is then used to determine the selection location which is obtained due to the displacement of the second touch input in the following manner.

The distances between the selection location prior to the displacement and the new selection location along each of these directions D1, D2 are for instance chosen to correspond to a multiple of the traveled distance of the remaining touch input along the corresponding direction D1, D2.

Advantageously, this multiple is different from 1, which allows for scaling effects between the displacement of the second touch input TI2 on the interface INT and the displacement within the GUI of the selection location due to the displacement of the second touch input TI2.

This multiple may be greater or smaller than 1. In addition, to each direction D1, D2 may correspond a multiple different from that of the other direction. In the example of FIG. 5, the multiple of each direction D1, D2 is taken equal to two.

The user may switch from the dragging mode to the fine tuning mode by performing a new touch input on the interface while the dragging mode is active. In effect, this new touch input corresponds to an additional finger being pressed on the interface INT.

In effect, this new touch input may be seen as the first touch input being reestablished.

After being detected, the new touch input is associated with a new location in the GUI, whereby a movement of the new touch input causes a movement of the associated new location in the GUI.

When this new touch input has been detected, i.e. when the first touch input has been reestablished, the control module CTRL proceeds to implement the fine tuning mode.

In the fine tuning mode, the selection location SL is determined in a fashion similar to that used to determine the first selection location during step S2. In other words, the selection location SL is determined to be the middle of the segment defined by the location associated with the touch input that was previously active in the dragging mode (e.g. the second location if the first touch input was released) and the location associated with the new touch input. As such, the mode through which the user defines the first selection location also corresponds to the fine tuning mode, the selection location then being associated with the first and second locations.

The user may then switch back to the dragging mode by releasing one of the two touch inputs currently active, in a manner similar to that used to define the first selection location SL1. It should be mentioned that the touch input released to switch from the fine tuning mode to the dragging mode may be different from that which was used to trigger this switch previously or even to perform the initial preselection. In fact, for instance, the user initially releases the first touch input TI1 to define the first second location SL1, which triggers the dragging mode, then reestablishes the first touch input to switch to the fine tuning mode, then may decide to release the second input to switch again to the dragging mode.

Upon switching from the fine tuning mode to the dragging mode, the same process of initializing the selection location at a given position and associating it with a touch input is performed. For instance, the given position corresponds to the location in the GUI associated with the touch input that remains at the time the other touch input is released.

Once the user has placed the selection location to the desired position in the GUI, or if the given position at which the selection location has been initiated is satisfactory, he defines the second selection location by releasing the touch input/touch inputs which is/are currently active, i.e. which are associated with the selection location and by whose movements the selection location is modified. If in dragging mode, he releases the touch input associated with the selection location, whether the first touch input, the second touch input or the third touch input. If in fine tuning mode, he releases both input touches. For instance, this release is detected as having occurred if conditions are met, for instance conditions regarding the release of the various touch inputs being substantially simultaneous.

The position of the selection location SL at the moment of this release then corresponds to the second selection location SL2 (illustrated by a triangle containing a cross on FIG. 6), which is determined by the interface controller ICTRL, the corresponding information being sent to the processor CPU for storage in the memory MEM.

Advantageously, at least in the dragging mode, when the selection location SL is brought to a distance of an edge of the interface inferior to a predetermined threshold, the control module CTRL triggers a page scrolling of the content displayed on the display, and by doing so, of the displayed GUI elements.

The direction of the scroll is for instance determined by the nature of the corresponding edge (top/bottom or side edge).

This may also be implemented based on the location on the GUI of the remaining touch input rather than on the position of the selection location, or may be implemented based on both of these positions.

Along with the first selection location SL1, the second selection location SL2 forms an extremity of the preselection PRESEL. All or part of the GUI elements located between these two selection locations SL1, SL2 are thus selected. Advantageously, all of them are selected.

As previously discussed, whether the GUI elements in the neighborhood of the first and/or second selection location are considered inside the preselection PRESEL may be chosen freely, and the notion of neighborhood may be adjusted, in particular for textual GUI elements.

As such, the first and second locations form the extremity of a preselection area AREA of the GUI whose GUI elements form the preselection PRESEL.

Once the preselection PRESEL has been defined, during a step S6, the control module CTRL proceeds to carry out a selection of the preselection PRESEL.

This operation of selection includes at least memorizing in the memory MEM data regarding the preselected GUI elements and which serves to identify these elements, for instance for further operations.

These data may include information related to the GUI elements and/or information regarding the first and second selection locations.

For instance, these data comprise or consist in the content of the GUI elements itself, their location, and/or an identifier of the GUI elements.

It may also or alternatively comprise or consist in the coordinates of the first and second selection locations SL1, SL2.

After the selection is performed, other actions, like a "copy" function, a "paste" function, a "cut" function, a "share" function designed to share the selected elements on a social network or the like, can be triggered by a user interaction, such as a new touch input on a GUI element, like a virtual button.

To that end, upon selection of the GUI elements, the control module CTRL may command the display of a contextual menu offering the corresponding functions which may each be triggered by a touch input by the user.

The invention presents several advantages.

In fact, it reduces the amount of operations the user has to carry out to perform a selection of GUI elements through the definition of an initial preselection of GUI elements which is easily adaptable to his desires as it relies on two input touches on the interface which can each be released to trigger the initial preselection.

Moreover, the operation of selection GUI elements according to the invention is of increased precision, as it relies on gestures which do not obstruct the areas of interest on the GUI.

Therefore, the risk of unwanted selections and reiterated manipulations is lowered, thereby contributing to reducing the involvement of the various components of the device DEV, and in particular the energy spent by the battery to that end.

In particular, the definition of the selection location as the middle of the segment between the first and second locations allows for a more precise positioning of the selection location as a movement of a single finger will cause a smaller movement of the selection than in a configuration in which a single finger is used to position an possible equivalent of the selection location.

It is also adaptable, as it offers two easily accessible placement modes for the selection location, further reducing the risk of unwanted manipulations and improving the user experience as a whole.

Other embodiments may further be envisaged.

Although the present disclosure has been described with reference to one or more examples, workers skilled in the art will recognize that changes may be made in form and detail without departing from the scope of the disclosure and/or the appended claims.

The invention claimed is:

1. A method for selecting at least one element of a Graphical User Interface (GUI), displayed on a display of a device using a touch interface of said device, the method comprising:

detecting on the touch interface a double touch input, said double touch input comprising a first touch input and a second touch input on the touch interface, said first and second touch inputs respectively corresponding to a first location and a second location on the GUI, determining a selection location between the first and second locations, upon detecting a release of the first touch input, determining a first selection location corresponding to the selection location at the moment of the release of the first touch input, determining an initial preselection comprising at least one GUI element located between the first selection location and the second location, determining a preselection of at least one GUI element based on the initial preselection by modifying an aspect of the at least one GUI element of the initial preselection, and executing a selection of said preselection.

2. The method according to claim 1, further comprising detecting on the touch interface a displacement of at least one touch input among the first and second touch inputs, and adjusting the position of the corresponding first or second location and of the selection location as a function of said displacement.

3. The method according to claim 1, wherein determining the preselection comprises determining that the preselection corresponds to the initial preselection.

4. The method according to claim 1, wherein determining the preselection comprises determining a second selection location as defined by a user using the touch interface, said preselection comprising at least one GUI element located between the first selection location and the second selection location.

5. The method according to claim 4, wherein determining the second selection location is carried out as a function of a further selection location, and wherein defining the second selection location further comprises:

after said release of the first touch input has been detected, initializing a position of the further selection location at a given position, determining a new selection location as defined by the user using the touch interface, and determining the second selection location as a function of the new selection location.

6. The method according to claim 5, wherein the further selection location is initialized at a position corresponding to the position of the second location at the time of said release of the first touch input.

7. The method according to claim 5, wherein after initialization of the position of the further selection location, the further selection location is associated with the second touch input, whereby a movement of the second touch input on the interface causes the further selection location to move in the GUI, thereby defining the new selection location.

8. The method according to claim 7, wherein detecting the release of the first touch input triggers a dragging mode in which the further selection location is configured to be modified by a user by moving on the touch interface the touch input associated with the further selection location, and wherein detecting a new touch input on the interface during the dragging mode triggers a fine tuning mode in which the further selection location is located between a new location of the GUI associated with the new touch input and a location in the GUI associated with the touch input and the further selection location was associated with in the dragging mode prior to the triggering of the fine tuning mode, whereby in said fine tuning mode, the further selection location is configured to be moved by a user by moving the new touch input and/or the touch input the further selection location was associated with in the dragging mode prior to the triggering of the fine tuning mode.

9. The method according to claim 7, wherein determining the second selection location as a function of the new selection location comprises detecting a release of the touch input or the touch inputs associated with the selection location, and determining the second selection location as the position of the further selection location at the time of said release of the touch input or the touch inputs associated with the selection location.

10. The method according to claim 5, wherein the method further comprises displaying on the GUI a touch input marker at a position distant from the position of the further selection location upon initialization of the position of the further selection location, detecting that a third touch input has been performed at a location of the touch interface corresponding to the touch input marker, and associating the further selection location with the third touch input, whereby a movement of the third touch input causes a movement of the further selection location in the GUI.

11. The method according to claim 1, wherein the method further comprises displaying on the GUI a location marker at the selection location to make said selection location visible.

12. The method according to claim 1, wherein detecting the double touch input comprises determining that the double touch input is of a predefined type, wherein said predefined type is defined by at least one of the criteria according to which the predefined type corresponds to a pressure applied to the touch interface simultaneously for the first and second touch input, and the first and second touch input have a duration greater than a predetermined threshold.

13. The method according to claim 1, wherein the GUI elements comprise text elements, and wherein the preselection includes a sequence of the text elements located between the first selection location and the second location.

14. The method according to claim 1, wherein the GUI elements of the preselection are highlighted.

15. A non-transitory computer storage medium storing a computer program comprising instructions for executing a method when the instructions are executed by a processor of a device, wherein the method includes selecting at least one element of a Graphical User Interface (GUI) displayed on a display of the device using a touch interface of said device, and wherein the instructions configure the device to perform the following acts:

detecting on the touch interface a double touch input, said double touch input comprising a first touch input and a second touch input on the touch interface, said first and second touch inputs respectively corresponding to a first location and a second location on the GUI, determining a selection location between the first and second locations, upon detecting a release of the first touch input, determining a first selection location corresponding to the selection location at the moment of the release of the first touch input, determining an initial preselection comprising at least one GUI element located between the first selection location and the second location, determining a preselection of at least one GUI element based on the initial preselection by modifying an aspect of the at least one GUI element of the initial preselection, and executing a selection of said preselection.

16. An apparatus comprising:
a control module for an electronic device comprising a touch interface and being configured to display a Graphical User Interface (GUI), said control module comprising:
a processor; and
a non-transitory computer-readable medium comprising instructions stored thereon, which when executed by the processor configure the control module to perform acts comprising:
 upon detection on said touch interface of a double touch input comprising a first touch input and a second touch input on the touch interface, said first and second touch inputs respectively corresponding to a first and a second location on the GUI, determine a selection location between the first and second locations,
 upon detection of a release of the first touch input, determine a first selection location corresponding to the selection location at the moment of the release of the first touch input,
 determining an initial preselection comprising at least one GUI element located between the first selection location and the second location,
 determining a preselection of at least one GUI element as defined by a user based on the initial preselection by modifying an aspect of the at least one GUI element of the initial preselection, and
 executing a selection of said preselection.

17. The apparatus according to claim 16, wherein the control module comprises an interface controller configured to detect inputs on the touch interface of said device.

18. The apparatus according to claim 16, further comprising the electronic device, which comprises a display adapted for displaying the GUI, and the touch interface adapted for interactions with the GUI, said electronic device further comprising the control module.

\* \* \* \* \*